L. S. GRAVES.
WEEDLESS FISH HOOK.
APPLICATION FILED MAY 24, 1913.
1,262,039.
Patented Apr. 9, 1918.
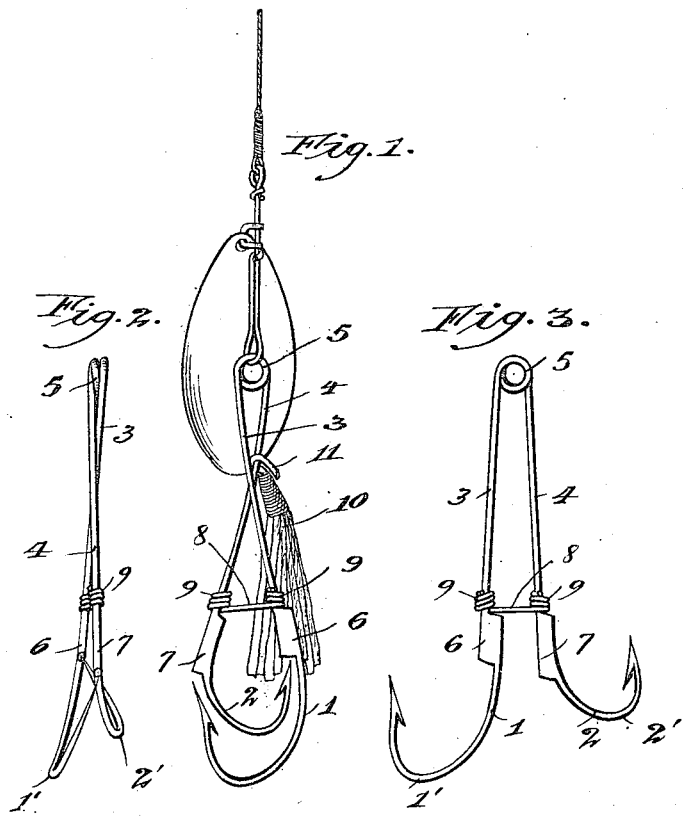
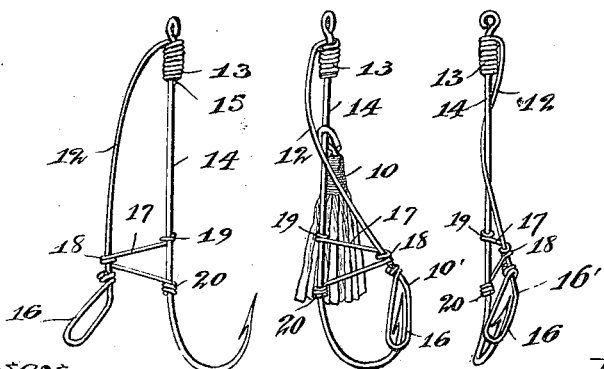

UNITED STATES PATENT OFFICE.

LESTER S. GRAVES, OF EVANSTON, ILLINOIS, ASSIGNOR TO ALBERT H. GRAVES, OF EVANSTON, ILLINOIS.

WEEDLESS FISH-HOOK.

1,262,039. Specification of Letters Patent. Patented Apr. 9, 1918.

Application filed May 24, 1913. Serial No. 769,758.

*To all whom it may concern:*

Be it known that I, LESTER S. GRAVES, a citizen of the United States, and residing at Evanston, in the county of Cook and State of Illinois, have invented certain new and useful Improvements in Weedless Fish-Hooks, of which the following is a specification.

This invention relates to improvements in weedless fishhooks, and among the salient objects of the invention are to provide a construction in which the guarding member or members are normally held in guarding position by a detent capable of being dislodged from holding position by the strike of a fish; to provide a device so organized that the springing of the guard or hooks may be effected by the striking of the lure carried by the hook or by pressure upon the hooks when taken into the mouth of the fish; to provide a construction so organized that the springing of the guard or hooks tends to hook the fish by the very action of so springing; to provide a construction in which the delicacy of springing or tripping may be adjusted in a convenient manner without the use of tools; and in general, to provide a simple and improved device of the character referred to.

The invention consists in the matters hereinafter described, and more particularly pointed out in the appended claims.

In the drawing—

Figure 1 is an elevation of a preferred embodiment of the invention in which two reciprocally-disposed mutually-guarding hooks are used;

Fig. 2 is an edge elevation of the hooks proper shown in Fig. 1, the spinner and lure being omitted;

Fig. 3 is an elevation of the hooks shown in Fig. 1 in sprung position; the spinner and lure being in this instance omitted;

Fig. 4 is an elevation of a modification in which a single hook is used;

Fig. 5 is a similar view with the guard thrown open, the lure being omitted;

Fig. 6 is an edge elevation of the hook with the guard in closed or set position.

Describing first the embodiment shown in Figs. 1 to 3, inclusive, 1 and 2 designate a pair of similarly shaped hooks, which are, however, of different size, the hook 2 being considerably smaller than its companion. These hooks are united with each other by shanks 3 and 4, which shanks at their upper ends merge into a coiled spring 5. Preferably the shanks and spring are integral with each other, *i. e.*, formed from a single piece of suitable spring wire, while the hooks proper are brazed to the lower ends of the shanks. In any event, the shank portions of the hooks are so formed as to provide guarding offsets 6 and 7, respectively; the offset of the larger hook being on the inside of the bowl of the hook and the offset 7 of the smaller hook on the outside of its bowl. The shanks and connecting spring are so shaped and tensioned that the shanks tend to diverge from each other, as shown in Fig. 3, and are capable of being brought into crossed relation, as shown in Figs. 1 and 2.

In order to hold the hooks in reciprocal guarding relation, as shown in Fig. 1, a detent 8 is provided which in the preferred construction shown consists of a length of wire arranged to connect the shanks at a point just above the offsets 6 and 7, the ends of which wire are coiled around the shanks in a manner to permit the shanks to turn freely in the eyes 9 thus formed. When the shanks are crossed the detent acts as a strut under compression, and when the shanks are separated it acts as a distance link. The shanks are so shaped that when brought into crossed relation, and bearing against each other at the point of intersection, as shown in Fig. 1, the detent stands inclined slightly beyond its dead-center pivotal position, so that the tension of the spring 5 causes the shanks to press against each other and thus come to a locked position, so-to-speak, instead of rotating in a direction to separate from each other.

Obviously with the parts thus arranged a comparatively slight wedging pressure between the shanks at their point of intersection will separate them sufficiently to carry the detent beyond its dead-center pivotal position in the direction to permit the hooks to open, and the instant this off-center position has been reached the hooks will snap open. To take advantage of this characteristic as a means of tripping the hook when it is struck by a fish, a lure 10 is provided, the upper end of which is provided with an eye or hook 11 which is hooked around one of the shanks, and when the hook is set rests just above the crossing point of the shanks, as shown clearly in Fig. 1. I have found that a lure, the main body of which is made of flannel strips, is very effective, because when struck by a fish the teeth of the fish catch in the lure, and the strike thus causes the tug necessary to spring the hook. It will, of course, be understood that the fisherman can use any suitably shaped and suitably colored lure to suit his fancy, and can change the lure as often as he desires.

To provide an additional means of springing the hook when taken by a fish, I prefer to employ hooks which have their points warped out of a straight plane, as is common with the great majority of fishhooks now on the market and as shown clearly in Figs. 2 and 6 of the drawing. Inasmuch as the hooks are reciprocally disposed, the point of each is brought underneath the guarding shoulder or offset 6 or 7 of its companion despite the fact that each hook is twisted as to its bowl portion; this mutually guarding relation being well shown in Fig. 2. As also clearly shown in Fig. 2, the lower extremities 1' and 2' of the bowls of the hooks diverge and stand away from each other a substantial distance when in "set" position. A squeezing pressure tending to close the hooks more nearly into the same plane with each other serves to throw the detent off from its locking or beyond-dead-center position, and therefore springs the hook just as effectually as a tug on the lure will.

The larger hook, it will be noted, is considerably longer than the smaller hook, thus providing ample space for hooking a bait upon this larger hook without interfering with the unsetting action of the hooks.

Since the ease with which the hook may be tripped or sprung will depend upon how far or how little the detent is inclined beyond the dead-center position when the hook is set, it is obvious that by bending or bowing the shanks very slightly throughout the region where they cross each other, the delicacy of tripping may be adjusted. Of course, it would be extremely difficult, especially without the use of tools, to thus bend the shanks so long as the detent occupies its normal position and holds them tied together, but as may be seen by reference to Fig. 3 there is nothing which prevents the detent from being slid upwardly toward the spring when the hooks are in the position shown in that figure. Therefore when it is desired to adjust the hooks, the detent is simply pushed up as near to the coiled spring as practicable, whereupon one hook may be taken in each hand and by forcing them out of their normal plane relation to each other in one direction or the other, the shanks can be bowed or sprung sufficiently to effect the necessary adjustment.

In the single hook construction shown in Figs. 4, 5 and 6 a wire guard 12 is substituted for the reciprocal hook. As a convenient construction the upper end of this guard is formed into a tight coil 13 which surrounds the upper end of the shank 14 of the hook. Two or three of the lower turns of this coil are soldered or brazed to the shank, as indicated at 15; the remainder being left free from each other so as to provide ample spring action. The lower end of the guard is provided with a loop 16 adapted to encircle and guard the point of the hook when in guarding relation, and the intermediate or shank portion of the guard is curved sufficiently to form a portion of a very long helical spiral, as shown clearly in Fig. 6. The lower end of the guard is so shaped as to extend about in alinement with the extremity of the twisted hook, as best seen in Fig. 6. A detent 17 is provided which corresponds in function to the detent 8 of the previously described construction. The detent 17 is desirably made with two legs or link members, being formed by coiling its central portion around the guard, as indicated at 18, and its two ends around the shank of the hook, as indicated at 19 and 20. To impart more stiffness to the structure as a whole the two links of the guard are disposed in divergent relation.

A lure 10 is applied to the shank of the hook in substantially the same manner as in the double hook and for the same purpose. The single hook is also capable of being sprung by a squeezing pressure brought upon the hook and loop of the guard, respectively. That is to say, the outwardly bowed portion 16' of the guarding loop 16 lies so prominently out of the plane or main plane of the hook proper that when the fish grasps the hook the guard is practically certain to be forced in the direction to throw its detent off-center and the guard into open position. This hook may be baited the same as any ordinary hook and without interfering with the operation of the guard.

As in the case of the double hook construction, this hook may also be adjusted as to its delicacy of tripping by sliding the detent toward the upper end of the shank and then bending the shank of the guard to increase or decrease its curvature.

From the foregoing it will be understood that the details of construction and arrangement may be modified within the scope of my invention.

I claim as my invention:

1. In a weedless fishhook, a pair of shanks flexibly connected at their upper ends, so as to permit them to assume both crossed and divergent relations, a spring associated with said shanks, tensioned to force them into divergent relation, and a distance link connecting said shanks below their points of intersection, whereby they are made to move in orbital relation in moving from set to unset positions and acting as a strut detent in the set position and as a distance tie in the unset position of the device.

2. In a weedless fishhook, a pair of shanks connected at their upper ends and, in the set or weedless position, crossing each other X-fashion between their ends, a spring acting upon said shanks and tensioned to throw them out of intersecting relation, a hook on one of said shanks, and a pivotal link detent connecting the lower portions of, and holding said shanks, in crossed relation, the parts carried by the respective shanks below their points of intersection being deflected out of the same general plane and relative movement of said parts toward the same plane serving to effect the release of said detent.

3. In a weedless fishhook, a pair of shanks connected at their upper ends and, in the set or weedless position, crossing each other X-fashion between their ends, a spring acting upon said shanks and tensioned to throw them out of intersecting relation, a hook on one or each of said shanks, trippable means holding said shanks in crossed relation, and a slide mounted above the point of intersection of said shanks and operating when forced into the angle of intersection to separate the shanks and thereby trip the hook.

4. In a weedless fishhook, a pair of shanks connected at their upper ends and, in the set or weedless position, crossing each other X-fashion between their ends, a spring acting upon said shanks and tensioned to throw them out of intersecting relation, a detent link connecting the shanks below the point of intersection and in the set position of the hook holding the shanks in set position by reason of its off-dead-center position.

5. In a weedless fishhook, a pair of shanks connected at their upper ends and, in the set or weedless position, crossing each other X-fashion between their ends, a spring acting upon said shanks and tensioned to throw them out of intersecting relation, a detent link connecting the shanks below the point of intersection and in the set position of the hook holding the shanks in that position by reason of its off-dead-center position, said link having both rotative and sliding engagement at its ends with the respective shanks.

6. In a weedless fishhook, the combination of a pair of shanks connected at their upper ends by means of a spring, tensioned normally to throw said shanks apart, said shanks being shaped to form an incipient twist around each other when brought into crossed relation between their ends, a distance link detent adapted to hold said shanks in crossed relation, a hook on each of said shanks, one larger than, and in set position encircling and guarding the other, and a guard on said smaller hook protecting the point of the larger one.

7. In a weedless fishhook, the combination of a pair of shanks formed of a continuous length of wire formed into a coiled spring at the juncture of the shanks, a link forming a bridged connection between the lower parts of said shanks, a hook on each shank, one of said hooks being arranged, when the device is in set position, to approximately encircle the other hook, and a guarding shoulder or offset on each shank, arranged to protect the point of the hook of the opposite shank.

8. In a weedless fishhook, the combination of a pair of shanks formed of a continuous length of wire formed into a coiled spring at the juncture of the shanks, a link forming a bridged connection between the lower parts of said shanks, a hook on each shank, one of said hooks being arranged, when the device is in set position, to approximately encircle the other hook, and a guarding shoulder or offset on each shank, arranged to protect the point of the hook of the opposite shank, and a lure slidably mounted on one of said shanks adapted to effect the tripping of the device.

9. In a weedless fishhook, the combination with a hook and a spring-actuated guard, adapted in the set position of the device to protect the point of the hook, of a lure, formed of pliable and penetrable material adapted to be caught by the teeth of a game fish, movably mounted on the device, and trippable means adapted to hold said guard in guarding relation to the hook, said lure being arranged to trip said trippable means when moved by a striking fish.

LESTER S. GRAVES.

Witnesses:
 EMILIE ROSE,
 F. L. BELKNAP.

Copies of this patent may be obtained for five cents each, by addressing the "Commissioner of Patents, Washington, D. C."